UNITED STATES PATENT OFFICE.

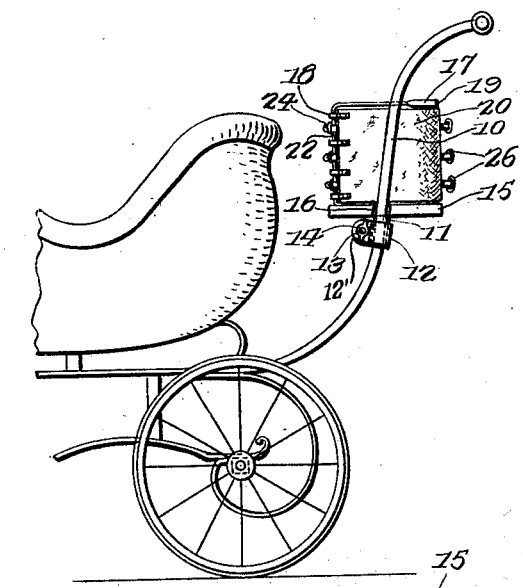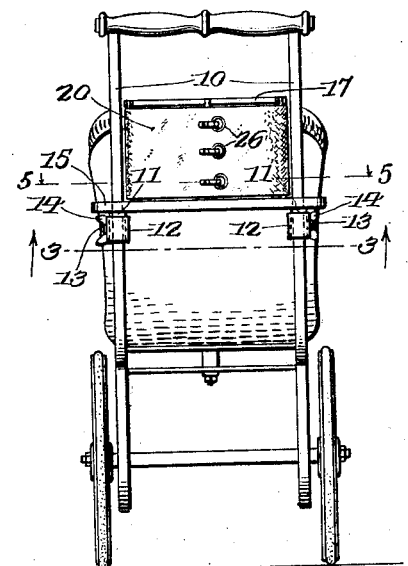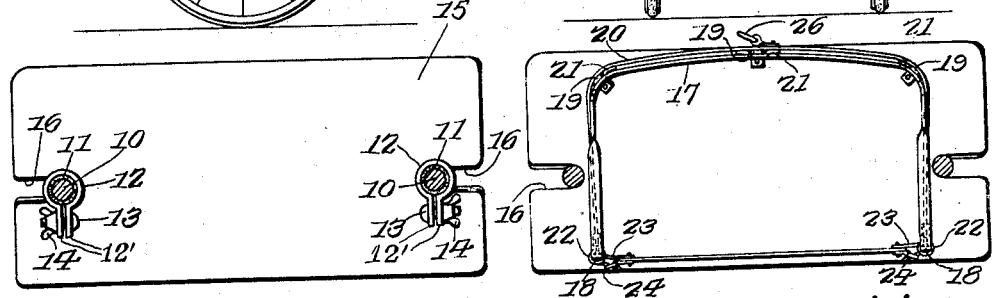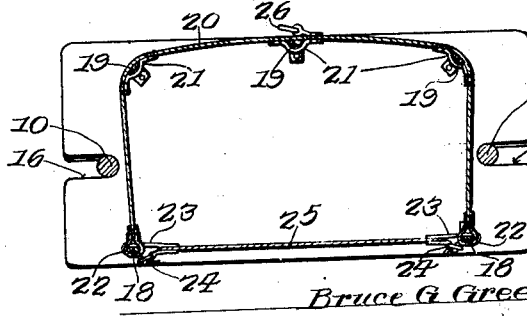

BRUCE G. GREEN, OF ANACONDA, MONTANA.

AUXILIARY SEAT FOR BABY CARRIAGES.

1,408,729.  Specification of Letters Patent.  Patented Mar. 7, 1922.

Application filed February 23, 1921. Serial No. 447,024.

*To all whom it may concern:*

Be it known that I, BRUCE G. GREEN, a citizen of the United States, residing at Anaconda, in the county of Deerlodge, State of Montana, have invented certain new and useful Improvements in Auxiliary Seats for Baby Carriages; and I do hereby declare the following to be a full, clear, and exact description of the invention, such as will enable others skilled in the art to which it appertains to make and use the same.

This invention relates to new and useful improvements in attachments for baby carriages, and particularly to auxiliary seats therefor.

One object of the invention is to provide an auxiliary seat for a baby carriage which can be easily and quickly applied to carriages now in use without modifications or changes to the carriages.

Another object is to provide an auxiliary seat for a baby carriage which will permit the accommodation of a second child without discomfort to either of them, and whereby the weight will be counter-balanced by the child on the auxiliary seat.

A further object is to provide an auxiliary seat of the character named having a back rest, and removable flexible members for attachment to the back rest whereby the seat may be converted into a receptacle for carrying packages.

Other objects and advantages will be apparent from the following description when taken in connection with the accompanying drawing.

In the drawing:

Figure 1 is a side elevation of a portion of a baby carriage showing the auxiliary seat applied thereto.

Figure 2 is a rear elevation of the carriage showing the position of the seat.

Figure 3 is a horizontal transverse sectional view through the bars of the carriage handle and the seat supporting stops, on the line 3—3 of Figure 2, looking upwardly.

Figure 4 is a top plan view of the auxiliary seat, the side bars of the handle of the carriage being shown in section.

Figure 5 is a horizontal transverse sectional view on the line 5—5 of Figure 2, showing the manner of securing the fabric to the seat.

Referring particularly to the accompanying drawing 10 represents the side bars of the handle of the baby carriage in connection with which the invention is particularly adapted for use. Engaged around each bar 10, at a point a suitable distance above the point of attachment of the bar to the body or frame of the carriage, is a split rubber collar 11, and engaged around this collar is a split metal collar 12. The collar 12 has outturned ends 12' in which is engaged a bolt 13, carrying a winged nut 14 on its threaded end for the purpose of securely clamping the collar on the bar 10. As clearly seen in the drawing, there is a collar around each of the bars 10, the same being disposed at the same level.

The seat proper comprises a board 15 formed of wood, or other material, of a length greater than the distance between the bars 10, and having in each end a central inwardly extending open-ended slot 16 for the reception of the bar 10. When in proper position, the board extends between the bars 10 and rests on the upper ends of the rubber collars 11, the portions of the ends of the board which are disposed at opposite sides of the slots projecting beyond the outer sides of the bars to prevent rocking movement of the board. When the board is not in use it is lifted from the collars and bars, the collars remaining on the bars until again needed.

The collars are formed to fit the handle bars of carriages now on the market, and the boards of lengths and widths suitable to handle bars of different diameters and distances apart. To apply the invention to the ordinary baby carriage, it is only necessary to properly and firmly clamp the collars around the bars and slip the seat into position.

It will be noted that the side walls of the slots 16 are formed obliquely to the upper and lower faces of the board so that when the board is properly engaged on the bars and collars, the board will rest in a horizontal plane.

A metal strap 17 has its forward end portions bent downwardly to form vertical posts 18, while the intermediate portion of the strip is disposed over the rear edge of the board 15 and rearwardly bowed. Vertical posts 19, also formed from strap iron, are secured to the rear portion of the seat board 15 and have their upper ends secured to the curved portion of the strap 17 to properly support the same in horizontal position.

A strip of fabric 20, of a width equal to the distance from the board 15 to the strap 17, is passed from one post 18, around the rear posts 19, to the other post 18, said strip having a series of attached loops 21 through which the posts 19 are disposed, the ends of the strip being provided with the pockets 22 which receive the front posts 18. Thus the fabric strip is securely stretched around the back rest and held in proper position. Arranged to be stretched across the front of the seat, between the posts 18, is a strip of fabric 25 of a width equal to that of the strip 20 and carried by the ends of the strip 25 are the straps 23 and the buckles 24, said straps being adapted to be engaged around the posts 18, between the pockets 22, and with the buckles, may be used to retain a child in the seat, by leaving the lower straps unfastened, so that the child's legs may pass thereunder.

By connecting all of the straps 23 the seat, in combination with the fabric walls, 20 and 25, is readily usable for the receptacle to contain packages, the same serving the function of a basket.

The central portion of the rear of the strip 20 carries the rings 26 with which the straps 23 are adapted to be engaged, when one end of the strip 25 is released from a post 18 and the strip drawn around toward the back of the seat.

With this attachment where there is only one carriage possessed by a family, and there are two children, one child is placed in the seat of the carriage while the second child is placed on the auxiliary seat. The weight of the child on the auxiliary seat serves to counterbalance the weight of the child within the carriage, so that the tilting of the carriage, up and down curbing, can be more easily and quickly accomplished. Furthermore, the child in the carriage is relieved from crowding, which occurs when two children are placed in a carriage which is made to accommodate but one child.

What is claimed is:

1. In an auxiliary seat for a baby carriage, the combination with the bars of the handle of a carriage, of supporting stop members removably carried by the said bars, and a removable seat supported on the stop members between said bars and having its ends partially embracing the bars.

2. In an auxiliary seat for a baby carriage, the combination with the side bars of the handle of a carriage of removable collars clamped on the said side bars, and a seat having its ends resting on said collars and formed with open-ended slots receiving the side bars.

3. A combined auxiliary child's seat and parcel carrier for a baby carriage including a bottom member having means for attachment to the handle bars of a baby carriage, vertical posts carried by the bottom member, a horizontal rail carried by the upper ends of the posts and extending throughout the sides and rear of the bottom member, a flexible wall enclosing the said sides and rear and having straps embracing the posts, the intermediate portion of the wall having a vertical series of loops, and a removable and foldable flexible wall connected to one of the posts and having means on its other end for interchangeable engagement with the opposite posts of the front of the device and with the said loops.

In testimony whereof, I affix my signature, in the presence of two witnesses.

BRUCE G. GREEN.

Witnesses:
G. H. FREDELL,
C. HARRINGTON.